June 23, 1959 W. R. COYNE 2,891,363
INSERT FEEDING APPARATUS
Filed June 20, 1955 3 Sheets-Sheet 1

INVENTOR
WILLIAM R. COYNE
BY
Williamson, Schroeder, Adams & Meyers
ATTORNEYS

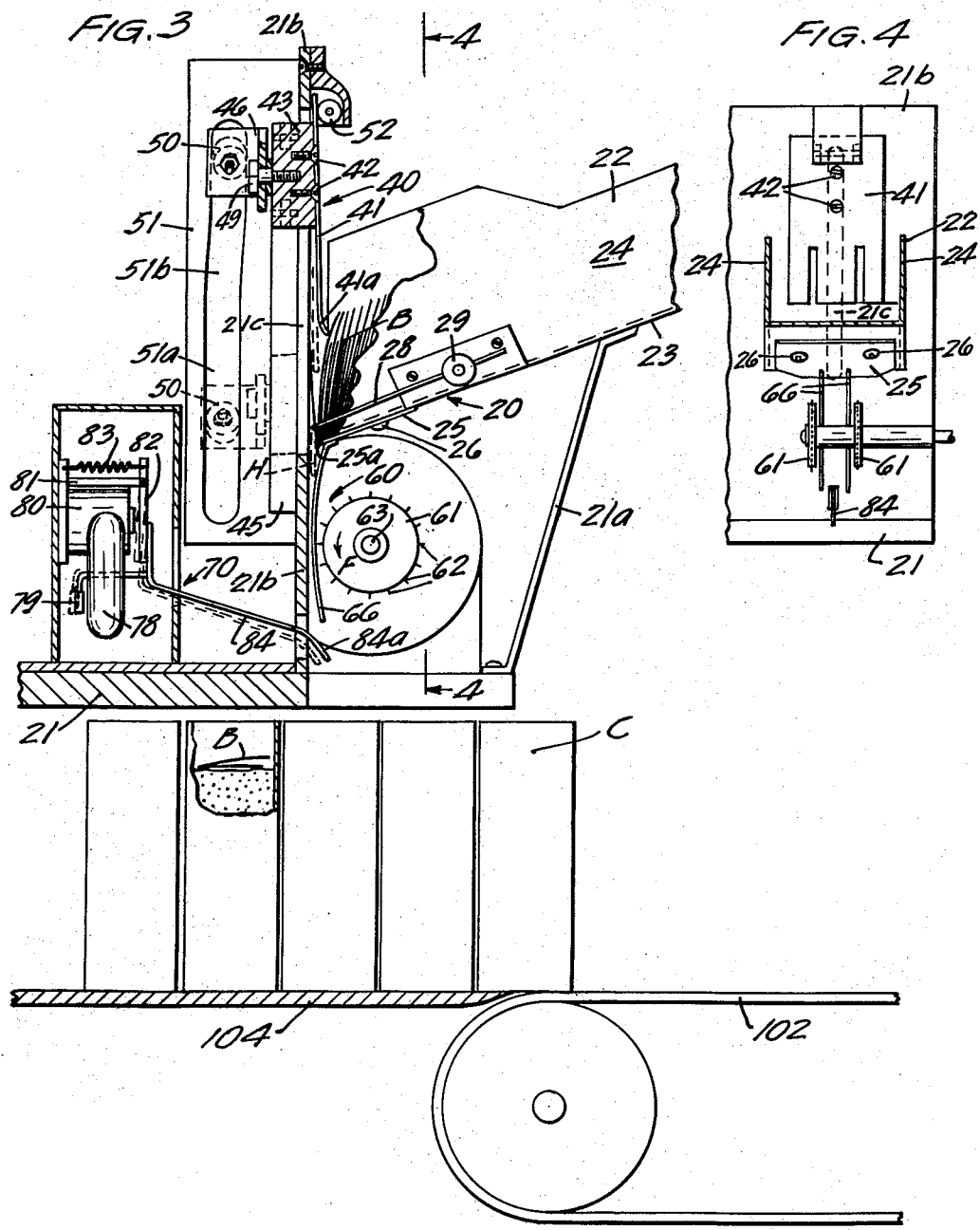

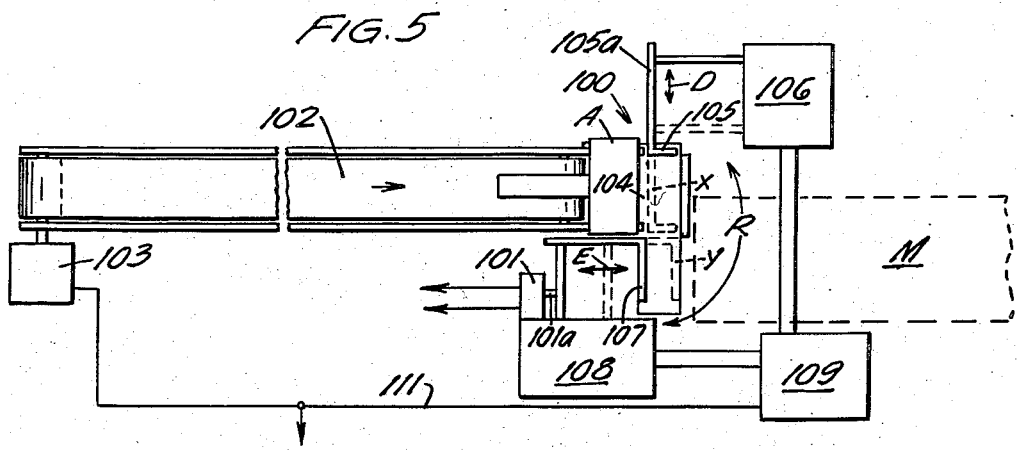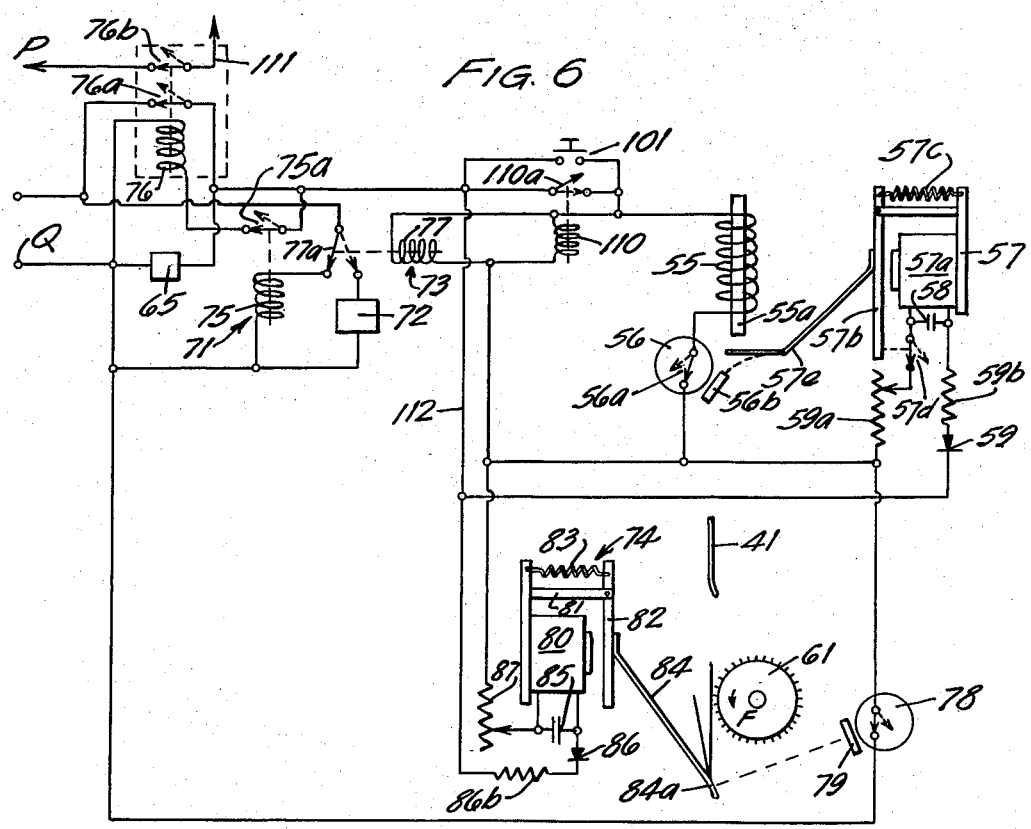

United States Patent Office 2,891,363
Patented June 23, 1959

2,891,363

INSERT FEEDING APPARATUS

William R. Coyne, Minneapolis, Minn., assignor to The Pillsbury Company, a corporation of Delaware Application June 20, 1955, Serial No. 516,497

11 Claims. (Cl. 53—59)

This invention relates to material-handling mechanism and more specifically relates to apparatus for feeding individual brochures or folder inserts into containers such as boxes and the like, moving along a conveyor system.

In the packaging of various types of materials such as food products, it is oftentimes desired to place brochures or other objects in the packages before the same are closed for shipment and sale. To manually inject such inserts into such packages is objectionable for several reasons, the most obvious of which is the cost of labor. However, to accomplish the same result with machinery presents several distinct and important problems. One of these problems is the singling out of individual brochures from a supply thereof for delivering the same into the containers, and another of these problems is the performing of the functions at the right time so as to make sure the inserts are properly deposited in the containers. Many types of brochures or folders are constructed of such types of material that with the rapid handling thereof, static electricity is developed on the surface of the brochures which cause them to stick to various machine and other surfaces unless they are positively handled and impelled with substantial force and speed. Of course the light weight and flexibility of such brochures and folders also adds to the problem of handling them quickly and positively.

It is oftentimes necessary in the handling of such brochures or folders to have them arranged in a certain manner in a stack. Because the brochures are rapidly handled when they are stacked, it is likely that there will be some of the brochures turned in the wrong direction and such brochures will impede the efficient and rapid handling thereof. The rapid handling of brochures is facilitated by their being asymmetrically folded so as to provide long flaps and short flaps and by their being arranged in a stack with the shorter flaps facing toward the discharge end thereof. The lower folded edge portion of the brochure and the upper open edge of the long flap of the brochure at the end of the stack may be retained to separate the short flaps of the end brochure and thereby admitting entrance of an ejecting device into the brochure for ejecting the same laterally away from the stack. If one of these asymmetrically folded brochures is arranged wrongly in the stack, the flaps thereof will not properly open and the ejecting device cannot enter the folder for the purpose of ejecting it.

With these comments in mind it is to the substantial elimination of these and other disadvantages in the handling of brochure inserts to which my invention is directed along with the inclusion therein of other novel and improved features.

An object of my invention is the provision of a new and improved machine for quickly and positively handling folders or brochures and for inserting individual folders into a series of open-topped containers or receptacles.

Another object of my invention is to provide a novel machine having a reciprocating type separating and delivery mechanism of relatively simple and inexpensive construction for urging the brochure inserts one at a time out of a supply thereof and delivering the same to a feeder mechanism which rapidly impels the brochure inserts into the open top of a container.

A further object of my invention is the provision of apparatus for injecting brochure inserts into a series of open-topped containers wherein a single reciprocating type mechanism both ejects the outermost brochure insert from the stack and also holds the remaining inserts in the magazine for holding the stack of inserts.

A still further object of my invention is the provision of apparatus for ejecting brochure or folder inserts into a series of open-topped containers wherein a reciprocating type ejector moves with a camming action while reciprocated to sequentially open the flaps of the brochure for admitting entrance of the ejector thereinto and to thereafter pull the central portion of the brochure insert outwardly of the magazine for separating the outermost brochure insert from the stack of brochures and discharging the same laterally of the stack.

An additional object of my invention is the provision in apparatus for feeding brochure inserts from a stack thereof into open-topped containers, of mechanism to monitor the discharging of brochure inserts, by the provision of a trip release to be engaged and operated by a brochure insert while the same is being positively engaged and impelled by the feeding apparatus.

Another object of my invention is the provision of a brochure or folder insert feeding apparatus having a reciprocating type ejector for discharging the inserts from the stack thereof for impelling such inserts into a series of open-topped containers moving along a conveyor system, and wherein the operation of the reciprocating ejector is timed with the movement of such containers along the conveyor system.

These and other objects and advantages of my invention will more fully appear from the following description made in connection with the accompanying drawings wherein like reference characters refer to the same or similar parts throughout the several views and in which:

Fig. 3 is a sectional elevation view taken on a vertical plane substantially at 3—3 of Fig. 1, and showing in addition the relation of a portion of the conveyor system which carries containers such as boxes and the like therealong for receiving inserts from the apparatus;

Fig. 4 is an elevation detail view taken on a plane substantially at 4—4 of Fig. 3 with certain parts of the apparatus shown in vertical section and other parts thereof removed for sake of clarity;

Fig. 5 is a diagrammatic plan view showing the container conveyor in its physical relation to the insert feeding apparatus and also showing certain portions of the electrical power and other circuits; and Fig. 6 is a diagrammatic electro-mechanical view showing the electrical circuit connected with the insert feeding apparatus and certain vital parts of the mechanical structure thereof.

Figure 1:
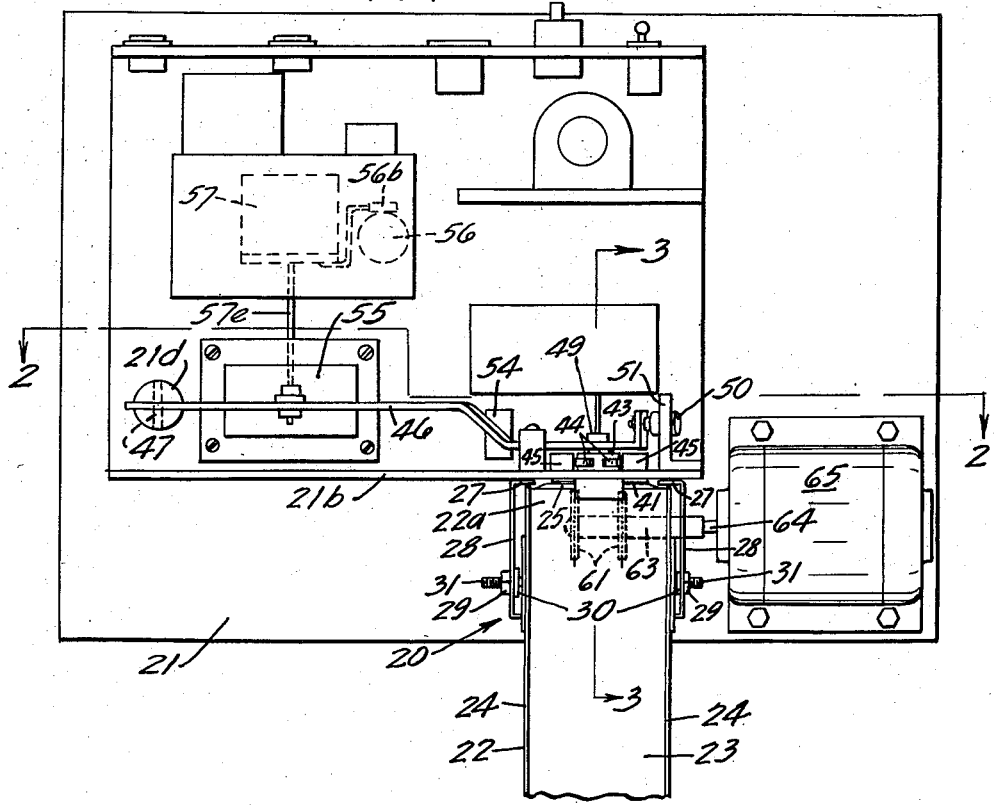
Fig. 1 is a top plan view of the apparatus for feeding brochure inserts, with parts thereof broken away.

The disclosed form of the apparatus comprising the subject matter of the invention includes means, indicated in general by number 20, including a frame 21 for holding a stack of brochures to be discharged one at a time into a series of open-topped containers. The preferred form of folder or brochure inserts to be used are best shown in Fig. 3 and are of the asymmetrically folded type so as to provide short flaps and long flaps, The brochure inserts in the stack are arranged with their short flaps facing the discharge end of the stack.

The apparatus also includes mechanism indicated in general by numeral 40, for separating the outermost brochure insert from the end of the stack and ejecting the same from the stack and delivering the brochure inserts laterally therefrom.

The apparatus also includes a positive feeder mechanism which is indicated in general by numeral 60, positioned laterally of the discharge end of the stack of brochures for receiving one at a time, brochure inserts delivered thereto by the ejector mechanism 40 and rapidly impelling the brochure inserts into the containers.

The apparatus also includes operation monitoring or verifying mechanism indicated in general by numeral 70 for determining and indicating whether a brochure insert is actually ejected from the apparatus for each operation of the ejector mechanism 40.

A conveyor system which is indicated in general by numeral 100 is shown for moving the series of open-topped containers along beneath the ejector mechanism 40 for receiving the brochure inserts therefrom.

The means for holding the stack of brochures indicated in general by numeral 20 includes an elongated and inclined magazine 22 which is suitably mounted on and supported by frame 21 and connected thereto as by brace 21a. Magazine 22 is provided with bottom 23 and upstanding side walls 24 disposed on opposite sides of bottom 23 and upstanding side walls 24 disposed on opposite sides of bottom 23 and extending the full length thereof. Magazine 22 has a discharge end 22a which is open to permit the brochure inserts to be discharged outwardly therethrough. At the bottom of the discharge end 22a of magazine 22 is provided a guide plate 25 which is adjustably positionable longitudinally of the magazine 22 and which is held in any desired position by suitable means such as screws 26. Plate 25 may be provided with elongated slots through the length of which, screws 26 may be moved as plate 25 is shifted. The inner terminal edge 25a of plate 25 is disposed adjacent the discharge end 22a of the magazine. Magazine 22 is also provided with insert-abutting retaining means which, in the form shown, comprises a pair of stop elements or pins 27 which are disposed on opposite sides of the discharge end of magazine 22. Pins 27 extend inwardly of and in proximity with the terminal edge 25a of guide plate 25 and are also disposed in substantial alignment in a direction transversely of the magazine with the inner terminal edge 25a of plate 25. Pins 27 are adjustably positionable in directions longitudinally of the magazine and transversely thereof. Pins 27 are, in the form shown, formed integrally of support rods or wires 28 which are removably and adjustably secured to magazine 22 by the inner and outer nuts 29 and 30 which are threadably mounted on lugs or studs 31. Lugs 31 are affixed to the magazine 22. By loosening the nuts 29, the pins 27 may be individually shifted vertically toward and away from guide plate 25, and longitudinally of magazine 22. Pins 27 may be moved inwardly and outwardly of magazine 22 by adjusting the position of both nuts 29 and 30 on the lugs 31.

The mechanism 40 for ejecting the brochure inserts out of the magazine 22 includes a thrust member 41 which may comprise a plate or vane and which is vertically disposed and mounted for vertical reciprocation on frame 21 and between the upstanding frame plate 21b and the discharge end 22a of magazine 22. The lower or inner end portion 41a of thrust member 41 is bent slightly outwardly away from the upstanding frame plate 21b and inwardly toward the magazine 22. Thrust member 41 is secured, as by screws 42, to a guide block 43 which extends through an elongated slot 21c in the upstanding frame plate 21b. Block 43 is provided, adjacent the rear side thereof, with a plurality of bearing rollers 44 which are journalled for rotation therein on axes extending generally horizontally. A pair of upstanding guide rails 45 are secured to the frame plate 21b on opposite sides of slot 21c to engage the rollers 44 on block 43 and guide the same in vertical reciprocation for maintaining the thrust member 41 in upstanding relation.

A driving arm or member 46 is swingably secured by pivot 47 to an upstanding rigid post 21d which is secured to and comprises a portion of frame 21, for vertical swinging movement. Arm 46 is provided in its vertically shiftable outer end portion with an elongated slot or opening 48 which is disposed adjacent to the upstanding guide rails 45. Arm 46 is connected to block 43 by means of a bolt 49 which extends through the slot 48 in arm 46 and is threadedly secured to block 43. Bolt 49 is free to shift longitudinally of slot 48 so as to transmit linear vertical movement to block 43 and thrust member 41 when arm 46 is vertically swung about pivot 47.

Means are provided for camming thrust member 41, as the same is reciprocated, in a direction toward and away from frame plate 21b and toward and away from the discharge end of magazine 22. Such means include a roller 50 which is rotatably mounted on the outer end portion 46a of arm 46 for rotation on an axis extending longitudinally thereof. A guide element or plate 51 is secured to the frame plate 21b and extends transversely thereof adjacent the outer end portion 46a of arm 46, and is provided with a vertically extending elongated guideway 51a which has an offset portion 51b substantially midway between the upper and lower ends thereof. Roller 50 is carried in guideway 51a to guide the outer end portion 46a toward and away from frame plate 21b when the same is vertically shifted and to correspondingly cam the thrust member 41 toward and away from the discharge end portion 22a of magazine 22. The means for camming thrust member 41 also includes a roller 52 which is journalled on frame plate 21b adjacent the upper edge thereof and adjacent the upper limit of reciprocation of thrust member 41. Roller 52 is disposed in spaced relation with the outer surface of frame plate 21b to permit insertion of the upper end of thrust member 41 therebetween. When thrust member 41 is shifted upwardly it is cammed outwardly away from frame plate 21b by action of the cam guide 51 and roller 50, and as the upper portion of thrust member 41 engages roller 52, the upper portion of the thrust member is urged inwardly again toward the upstanding frame plate 21b and the lower curved end portion 41a of thrust member 41 is forced outwardly away from frame plate 21b and inwardly of the discharge end 22a of magazine 22.

Means are provided for limiting the vertical movement of arm 46, and in the form shown, such means comprise a stop member 53 which is affixed to frame plate 21b for limiting the upward movement of arm 46, and a bumper 54 which is mounted on a support 54a which is affixed to the frame 21. Stop member 53 and bumper 54 may be covered with a tough and rugged material, such as leather, to reduce the wear thereon and to reduce the impact thereagainst by arm 46.

Powered mechanism is provided for reciprocating thrust member 41 and arm 46 and in the form shown, such means includes a solenoid 55 mounted on frame 21 and having a vertically shiftable armature 55a which is swingably connected to arm 46 by means of link 55b adjacent the inner pivoted end portion of arm 46. Solenoid 55 is operated in synchronism with conveyor mechanism 100 to reciprocate thrust member 41 as the containers C progress on the conveyor system. Solenoid 55 is connected to an electric circuit to be energized by operation of a contactor 101, the operation of which will be hereinafter more fully described, and which is mounted for operation in synchronization with the conveyor system 100.

Means are provided for deenergizing solenoid 55 each time the same has operated to draw the armature 55a thereof downwardly and for positively holding the solenoid deenergized for a period of time. Such means include a magnetic type switch 56 of a commonly known type wherein the shiftable contactor 56a is spring mounted to normally remain out of engagement with the fixed contactor of the switch. The shiftable contactor 56a may be influenced by a magnetic field to draw it into engagement with the fixed contact to close the circuit. A shiftable permanent magnet 56b is shiftably mounted in close proximity with magnetic switch 56 to operate the contactor thereof.

Figure 2:
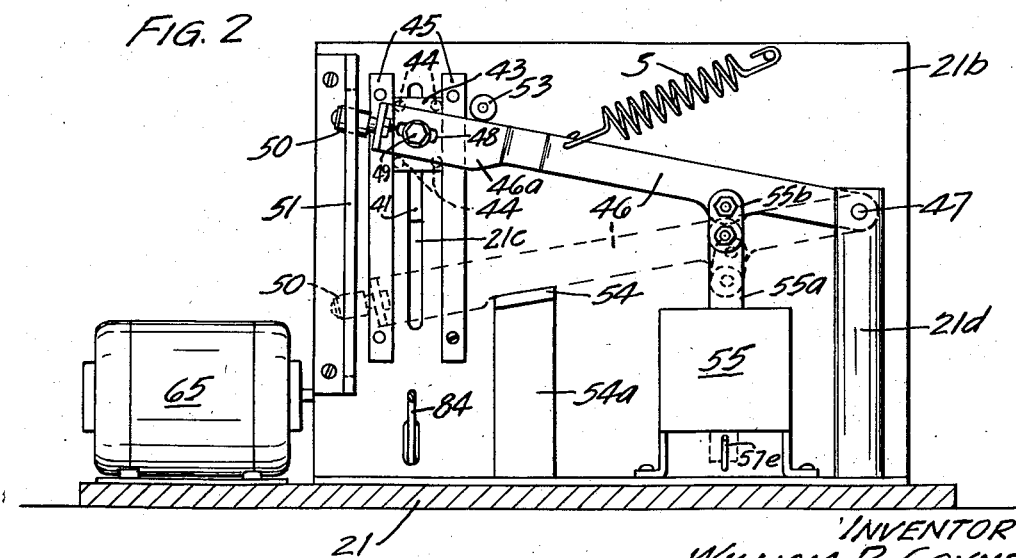
Fig. 2 is a vertical elevation sectional view of the apparatus shown in Fig. 1 and taken generally along a line indicated at 2—2 of Fig. 1.

Movement of magnet 56b is controlled by a relay 57 which has a coil 57a, a shiftable armature 57b which is biased by a spring 57c, contacts 57d which are connected to the shiftable armature 57b for operation thereby, and an elongated trigger or trip arm 57e. The relay 57 is suitably mounted on the frame 21 behind the solenoid 55 with the elongated trip arm 57e thereof extending beneath the solenoid, as best shown in Fig. 2, to be engaged by the solenoid armature 55a when the same is shifted downwardly. Permanent magnet 56b is connected to the shiftable armature 57b of relay 57 to be shifted therewith and with shifting of the elongated trip arm 57e, so as to shift away from magnetic switch 56 and permit the same to open when the solenoid armature 55a engages trip arm 57e. A condenser 58 is connected in parallel across the relay coil 57a to be charged when the same is energized and to be discharged therethrough when contact 57d of the relay 57 opens with shifting of the armature thereof. A selenium rectifier 59 is connected in series with the coil 57a and condenser 58 to permit only D.C. current in the coil and condenser and a potentiometer 59a is also connected in series to the coil 57a and condenser 58 to vary the voltage applied thereto. The relay 57 is substantially continuously energized, as will be hereinafter more fully described and the potentiometer 59a is adjusted to set the voltage and current in the coil 57a so that the magnetic field of the coil 57a will not quite overcome the effect of spring 57 to draw the shiftable relay armature 57b into shifted position, but the coil 57a will, after trip arm 57b has been shifted by the solenoid armature 55a hold the armature 57b thereof in shifted position. It will be seen that when the arm 57b of relay 57 is shifted, the contact 57d will open to disconnect the coil 57a from the circuit. Condenser 58 will thereupon discharge through coil 57a causing the same to hold the armature 57b in shifted position for a short period of time so as to maintain magnetic switch 56 open for a similar length of time.

As best shown in Fig. 2 a tension spring S is connected between the upper portion of the frame plate 21b and the driving arm 46, to retract the arm 46, thrust member 41 and the solenoid armature 55a upwardly when the solenoid 55 has been deenergized.

The positive feeder indicated in general by numeral 60 is provided with a pair of rapidly moving friction elements 61 mounted for rotation about an axis extending generally transversely of magazine 22 and disposed laterally of the discharge end 22a thereof and below guide plate 25. In the form shown, friction element 61 comprises a wheel having a plurality of teeth or pins 62 extending generally radially outwardly from the axis of rotation thereof. The teeth 62 of the spaced rotating wheels 61 rotate in close proximity with the outer surface of frame plate 21b and below the opening between the outer terminal edge 25a of the guide plate 25 and frame plate 21b. Wheels 61 are secured to a shaft 63 which is affixed to the spindle 64 of a high speed motor 65 mounted on frame 21. A pair of upright guide elements 66, best shown in Figs. 3 and 4, are disposed adjacent the outer periphery of wheels 66 and in spaced relation with the frame plate 21b. The guides 66 are elongated and in the form shown are constructed of wire. Guides 66 are affixed to the guide plate 25 adjacent the inner terminal edge thereof and thereby mounted in substantially fixed relation with respect to the rotating wheels 61 and the magazine 22.

The operation monitoring mechanism 70 includes a power control device 71 which is normally energized, for controlling the supply of power to the conveyor system 100 and the ejector mechanism 40, an alarm or warning device 72 which is normally deenergized, a time delay control device 73 which is energized simultaneously with the energization of solenoid 55 each time switch 101 is closed and which controls the operation of the power control device 71 and alarm 72 to respectively deenergize and energize the same after a time delay subsequent to the energization of solenoid 55, and the monitoring mechanism 70 also includes means for deenergizing the time delay control device 73 to prevent operation thereof after a brochure insert is ejected with each operation of the ejector mechanism 40 and solenoid 55, such means being indicated in general by numeral 74.

The power control device 71 includes control relay 75 having contactors 75a which are connected to a power relay 76, the contactors 76a and 76b thereof respectively controlling the operation of the ejector mechanism 40 and the conveyor system 100.

The alarm device 72 comprises, in the preferred form, a horn, but of course could comprise any of a number of suitably known warning devices. The time delay control device 73 comprises a time delay relay of a well known type having a coil 77 which operates the contacts 77a of the device after a time delay subsequent to the energization thereof. Coil 77 is energized when switch 101 is closed and will operate the contacts 77a if the coil is not deenergized before the predetermined time delay has elapsed.

The means for de-energizing the time delay relay 77 include a magnetic type switch 78 similar to switch 56, of a commonly known type, which is connected in series with coil 77 and which has associated therewith, a shiftable permanent magnet 79 to be operated thereby. A relay type coil 80 having a frame 81 is suitably mounted on the frame 21 of the insert feeding apparatus. A shiftable magnetic arm or armature 82 is carried on coil frame 81 in proximity with the end of coil 80 and is biased by a spring 83 in its normal position away from coil 80. The permanent magnet 79 for operating magnetic switch 78 is connected to shiftable arm 82 for movement therewith. An elongated trip release or trigger 84 is also connected to the shiftable arm 82 for movement therewith and has its outer end portion 84a extending through an opening in the upright frame plate 21b at a position directly below the friction element 61 of feeder 60 and disposed a distance therefrom which is less than the heighth of the brochures B to be discharged from magazine 22.

Condenser 85 is connected in parallel with coil 81, and a selenium rectifier 86 and a potentiometer 87 are connected in series with the parallel-connected condenser 85 and coil 80. As will hereinafter be more fully described, coil 80 is energized through magnetic switch 78 and is normally substantially continuously energized except when magnetic switch 78 is periodically opened. Potentiometer 87 is adjusted to set the voltage of coil 80 so that the coil 80 will not quite, by its own power, draw the shiftable arm 82 out of its normal position because of the bias exerted on arm 82 by spring 83. The force exerted on the trip release 84 by a brochure insert being positively impelled by friction wheel 61 is sufficient when added to the magnetic force exerted against arm 82 to overcome the effect of the biasing spring 83 to shift arm 82 and cause the permanent magnet 79 to shift and thereby open magnetic switch 78. Opening of magnetic switch 78 de-energizes the time delay control device 73 to prevent de-energization and operation of the power control relay 71 and energization of the warning device 72.

The conveyor system 100 as best shown in Fig. 5, includes a conventional type continuous belt-type conveyor 102, driven by a suitable source of power, such as motor 103, for delivering containers such as boxes C therealong toward the insert feeding apparatus, the outline of which is indicated by letter A and toward the ram-type oscillating conveyor mechanism indicated in general by letter R. A support plate 104 is mounted at the discharge end of the belt conveyor 102 in substantially co-planar relation therewith for receiving containers C from the belt conveyor 102. The containers C will slide over plate 104 as they are removed therefrom by the oscillating ram-type conveyor mechanism R and as more containers C are pushed thereon by the belt conveyor 102. A ram or pusher 105 is disposed above plate 104 for movement thereacross between the full line position shown in Fig. 5 and the dotted line position X thereof. Ram 105 is mechanically connected to a mechanical oscillator drive mechanism 106 to be reciprocated thereby in the directions of the double-ended arrow D.

A second ram or pusher 107 is also disposed above plate 104 and laterally of the discharge end of belt conveyor 102 for receiving containers delivered thereto by ram 105 and for reciprocating in the direction of double-ended arrow E between the full line position shown and the dotted position Y thereof for delivering the containers to another machine M which might comprise a container-closing or sealing mechanism, but which comprises no part of the invention. Ram 107 is connected to a mechanical oscillator 108 to be reciprocated thereby. Switch 101 which controls the operation of the insert feeder mechanism is suitably mounted to be operated each time the ram 107 is retracted and has a shiftable element 101a engaging a portion of ram 107. Mechanical oscillators 106 and 108 are connected to a source of rotary power such as motor 109 and are of the cam controlled type so as to be operated in synchronization with each other.

Motors 109 and 103 are continuously energized when the conveyor system 100 is in continuous operation and may be connected by line 111 to a common source of power.

As pusher 105 is shifted across the plate 104, it delivers a container in front of pusher 107 and at the same time prevents movement of the other containers on plate 104 with its elongated side plate 105a and when pusher 105 is retracted the containers on plate 104 will be moved ahead by the influence of belt conveyor 102 acting through the other containers on plate 104 to push another container in front of ram 105. Pusher, or ram, 107 is projected to move the container delivered thereto by pusher 105 off the edge of plate 104 to be picked up by machine M. When ram 107 is retracted switch 101 will be operated to cause energization of the electric circuit controlling the ejector mechanism 40 and solenoid 55 to inject a brochure insert into a container moving thereunder.

A relay 110 is connected for energization with closing of switch 101 and has its contacts 110a connected across switch 101 so as to bypass switch 101 after the same has been closed and then reopened for holding the electric circuits, energized by switch 101, closed until relay 110 is again de-energized. Relay 110 is connected in series with magnetic switch 78 to be de-energized thereby when opened.

The following is a complete description of the electrical circuits associated with the insert feeder mechanism. The power line 111 for motors 103 and 109 is normally connected through the closed contact 76b of power relay 76 to a source of electric power P. The brochure insert feeding apparatus may be connected to a separate source of power at Q through the normally closed contact 76a of power relay 76. Motor 65 which drives friction element 61 may also be connected to the source of power through the contact 76a. Power relay coil 76 is connected across the source of power Q through the contact 75a of the power control device 71 and is normally energized. The coil 75 of control relay 71 is normally energized and is connected through contact 77a of the delay device 73 to cross the source of power Q. Warning device 72 is normally de-energized and is energized by shifting of contact 77a when the time delay device 73 has operated after a time delay subsequent to the energization thereof.

One side of relay coil 57a is connected through the current limiting resistor 59b, rectifier 59, wire 112 and power relay contactor 76a to one side of the source of power Q, and the other side of relay coil 57a is connected through its contactor 57d, potentiometer 59a and magnetic switch 78 to the other side of the source of power Q.

One side of coil 80 is connected through current limiting resistor 86a, rectifier 86, wire 112 and power relay contactor 76a to one side of the source of power Q, and the other side of coil 80 is connected through potentiometer 87 and magnetic switch 78 to the other side of the source of power Q. Coils 57a and 80 are both normally energized, and coil 57a is de-energized with the opening of contactor 57d associated therewith, and coil 80 is de-energized with the opening of magnetic switch 78.

Switch 101 is connected at one side through power relay contact 76a to one side of the source of power, and the other side of switch 101 is connected to three different circuits for energizing the same when closed. The coil 77 of time delay device 73 is connected at one side to switch 101 and is connected at the other side thereof through magnetic switch 78 to the other side of the source of power Q.

One side of relay coil 110 is connected to switch 101 for energization therethrough and the other side of relay coil 110 is connected through magnetic switch 78 to the other side of the source of power Q.

One side of solenoid winding 55 is connected to switch 101 for connection to one side of the source of power Q and the other side of solenoid winding 55 is connected through magnetic switches 56 and 78 to the other side of the source of power Q.

Operation

Normally power relay 76 and power control relay 75 are energized so that power is supplied to the conveyor motors 103 and 109, to the motor 65 for driving friction element 61 and providing power at the contacts of switch 101. As the containers C are carried along belt 102 and are handled by the pushers 105 and 107, the switch 101 is periodically operated.

Closure of switch 101 simultaneously energizes the holding relay 110 for closing the contacts thereof and bypassing the switch 101, energizes the coil 77 of time delay device 73, and energizes the solenoid winding 55. When solenoid 55 is energized the armature 55a thereof will shift downwardly to move arm 46 downwardly and cause thrust member 41 to carry the outermost brochure in the magazine 22 laterally across the discharge end 22a thereof for delivering the brochure insert to the positive feeder 60. Solenoid armature 55a will impact the trip arm 57e which will cause arm 57b to be moved and to cause permanent magnet 56b to shift and thereby open magnetic switch 56. Solenoid 55 will thereby be de-energized and spring S will retract the armature 55a, arm 46 and thrust member 41 upwardly. Substantially simultaneously with the shifting of arm 57b of relay 57 the contacts 57d thereof will open to disconnect the coil 57a from the source of power Q. Condenser 58 will discharge through coil 57a and cause the arm 57b to be held in its shifted position for a period of short duration and thereby hold magnetic switch 56 open for such a period.

When the brochure insert has been ejected from the magazine by thrust member 41 and delivered to the positive feeder 60, the teeth 62 of wheel 61 will engage the brochure as they revolve in the direction of arrow F and impel the same downwardly at high speed toward the container disposed in alignment with the path of the insert. Guides 66 will assure that the brochure insert being impelled by the teeth 62 does not stick to the teeth. While the insert is still in positive engagement with the teeth 62 of wheel 61, the brochure insert will strike the trip release 84 of the monitoring mechanism 70 and will thereafter pass thereby into the container disposed below.

Because coil 80 is already energized, the relatively light impact of the brochure insert on the trip release 84 will cause the arm 82 to be drawn toward the coil by the magnetic field thereof. Substantially simultaneously with the moving of arm 82, the permanent magnet 79 will shift away from magnetic switch 78 and will cause the magnetic switch 78 to open, thereby disconnecting coil 80 from the source of power Q. Condenser 85 will discharge through coil 80 to maintain arm 82 and permanent magnet 79 in their shifted positions for a period of short duration.

Opening of magnetic switch 78 produces several results including the de-energization of the holding relay 110 and a corresponding opening of the contact 110a thereof, de-energization of the coil 77 of the time delay device 73, and disconnection of coil 80 from the source of power Q as already described. Opening of magnetic switch 78 also precludes any subsequent energization of solenoid 55.

When the coil 77 of time delay device 73 is de-energized the warning device 72 will be precluded from operation and the power control device 71 and the power relay 76 will be maintained in energized condition.

Because the closing of switch 101 is only instantaneous the switch 101 will have opened before magnetic switch 78 is reopened. The de-energization of holding relay 110 and the corresponding opening of the contacts thereof will therefore cause complete de-energization of all the circuit components which had been energized by the closing of switch 101.

The time between the opening and reclosing of magnetic switch 56, due to the discharge of condenser 58 through relay coil 57a is substantially shorter than the time between the energization of the time delay device 73 and the operation thereof, that is the shifting of contacts 77a thereof. Because of this substantial difference in time delay, the solenoid 55 will, upon the failure of a brochure to be discharged by the thrust member 41, operate several times in an attempt to discharge a brochure before the contacts 77a and time delay device 73 operate to de-energize the solenoid circuit through power relay contacts 76a. Therefore if a brochure in the magazine is slightly out of position so that it will not be discharged with the first operation of thrust member 41 subsequent operation of the thrust member may cause the brochure to be ejected thereby.

If a brochure insert is not ejected when the thrust member 41 is reciprocated, the trip release 84 of the monitoring mechanism 70 will not be impacted and the magnetic switch 78 will not be opened. As a result the coil 77 of the time delay device 73 will not be de-energized and the same will operate contact 77a thereof after a time delay approximating 2 or 3 seconds subsequent to the closure of switch 101. When the contacts 77a are shifted the warning device 72 will operate to sound its horn and the power control device 71 is de-energized to open the contacts 75a thereof and de-energize the power relay 76 which will close down the entire machine including the conveyor system 100.

The short time delay, provided between the opening of magnetic switch 56 and the reclosing thereof by the discharging of condenser 58 through relay coil 57a, prevents solenoid 55 from operating a second time before the contacts 110a of relay 110 reopen to de-energize the solenoid circuit.

The short time delay, which is provided between the opening of magnetic switch 78 and the reclosing thereof by the discharging of condenser 58 through coil 80, provides time for the coil 77 of time delay device 73 to completely de-energize and assume its starting condition before it is again energized.

When the thrust member 41 is projected downwardly from the full line position shown in Fig. 3, the lower end portion 41a thereof will slide between the short and long flaps of the outermost brochure in the magazine 22, and the thrust member 41 will cam away from the discharge end 22a of the magazine to draw the central portion of the outermost brochure away from the magazine and toward the frame plate 21b to permit the same to be carried laterally outwardly away from the magazine and be delivered to the positive feeder 60. The thrust member moves downwardly to its fully projected position indicated at H in Fig. 3 with sufficient rapidity to impel the brochure for free movement toward the positive feeder friction wheel 61.

After the thrust member 41 is retracted toward its upper limit of movement shown in full line position in Fig. 3, the lower end portion 41a thereof will cam outwardly due to the effect of roller 50 moving in the slot 51a of guide element 51 and due to the upper end portion of thrust member 41 being forced inwardly toward the frame plate 21b by roller 52. The lower end portion 41a of the thrust member 41 will move upwardly over the upper edge of the short flap of the outermost brochure and will engage the upper edge portion of the long flap of the outermost brochure and will force the upper edge of the long flap back into the magazine slightly. Because the lower edge portion of the brochure is retained by the pins 27 and because the upper edge of the long flap is retained by the lower end portion 41a of thrust member 41, the flaps of the outermost brochure in the magazine 22 will separate to admit entrance of the thrust member the next time the same is projected downwardly.

In use, the apparatus has been found to be positive in its operation for separating and ejecting brochures from the stack. The apparatus will operate successfully at speeds approximating 60 cycles of operation per minute, that is, the insertion of brochure inserts into 60 bags per minute.

It will be seen that I have provided new and improved apparatus for positively and quickly handling brochure inserts for delivering the same, one at a time, into a series of open-topped containers moving along a conveyor system, and for so delivering such inserts in synchronism with the containers moving along the conveyor system.

It should also be apparent that I have provided a novel machine having a relatively simple and inexpensive reciprocating type ejector mechanism for separating and delivering brochure inserts out of a supply thereof and delivering the same to a feeder mechanism which positively engages and throws the inserts into the open top of a container.

It should also be observed that I have provided an improved reciprocating type ejector mechanism in an insert feeding apparatus having a shiftable thrust member for holding the brochure inserts in the stack thereof and for opening the flaps of the outermost brochure insert to admit entrance of the thrust member for permitting the same to carry said outermost brochure insert laterally across the discharge end of the magazine holding the stack and deliver the insert laterally thereof.

It will, of course, be understood that various changes may be made in the form, detail, arrangement and proportion of the parts without departing from the scope of my invention which consists of the matter described herein and set forth in the appended claims.

What is claimed is:

1. Apparatus for feeding one at a time into a series of open-topped containers, brochure inserts from a magazine holding a plurality of such inserts to be discharged, said apparatus comprising a magazine for holding a plurality of such inserts with retaining means at the discharge end thereof for normally preventing discharge of said brochure inserts, a high speed, reciprocating thrust member mounted for movement across the discharge end of said magazine and engaging the outermost brochure insert to positively carry the same across the discharge end of said magazine and cast the same laterally thereof, stop means limiting movement of said thrust member across the magazine and constructed to instantaneously stop the thrust member and thereby causing the insert to be cast in free movement laterally of the magazine, a positive feeder spaced laterally from said discharge end of the magazine and from said predetermined position to which the insert is carried and receiving the cast brochure insert to positively engage said insert and discharge the same into the open mouth of a container disposed in alignment therewith.

2. Apparatus for feeding brochure inserts one at a time into a series of open-topped containers from a magazine holding a plurality of such inserts in a stack, said apparatus comprising a frame, a magazine mounted on said frame for holding such a stack of brochure inserts and having a discharge end with retaining means for normally preventing discharge of said brochure inserts, a reciprocating thrust member mounted on said frame for movement across the discharge end of said magazine and engaging the outermost brochure insert to positively carry the same across the discharge end of said magazine to a predetermined position and cast the same laterally thereof in free movement, an insert-guiding surface extending laterally of the discharge end of the magazine, a rapidly revolving driving element journalled on the frame adjacent said insert-guiding surface and in spaced relation with said predetermined position and said element having a plurality of radial insert-pricking teeth closely spaced from said surface to engage and drive said brochure insert along said guiding surface and into the open mouth of a container disposed in alignment therewith.

3. Apparatus for feeding brochure inserts one at a time into a series of open-topped containers from a magazine holding a plurality of such inserts in a stack, said apparatus comprising a frame, a magazine mounted on said frame for holding a plurality of such brochure inserts and having a discharge end with insert-abutting retaining means for engaging the outermost insert adjacent the lower edge portion thereof for restricting movement thereof outwardly of the end of the magazine, a reciprocating thrust member mounted on said frame for rapid movement obliquely across the discharge end of said magazine and engaging the outermost brochure insert to carry the same across the discharge end of said magazine and impel the same laterally thereof, said thrust member being mounted adjacent the discharge end of said magazine and continuously engaging and holding the upper edge portion of the outermost brochure insert in place at all times even during reciprocation thereof and thereby co-acting with said insert-abutting retaining means to restrict outward movement of the brochure inserts from the magazine in a direction longitudinally thereof, means for rapidly reciprocating said thrust member, and a stop member mounted at the discharge end of said magazine and on one side thereof and spaced rearwardly along the magazine from said retaining means for engaging the lower edge portions of the brochure inserts and permitting only the outermost insert to be discharged laterally of the magazine.

4. Apparatus for feeding brochure inserts one at a time into a series of open-topped containers from a magazine holding a plurality of such brochure inserts to be discharged, said apparatus comprising a frame, a magazine mounted on said frame for holding a plurality of such brochure inserts and having a discharge end and having an insert guiding side plate with a terminal edge disposed adjacent the discharge end of the magazine, said magazine also having a pair of spaced stop pins mounted on opposite sides thereof and in spaced relation with said plate and in substantial alignment with the terminal edge thereof for retaining the outermost brochure insert at its opposite sides, a reciprocating thrust member mounted on said frame for movement across the discharge end of said magazine in close proximity with the terminal edge of said plate and engaging the outermost brochure insert to carry the same across the discharge end of said magazine and deliver the same laterally thereof, said thrust member camming outwardly of the discharge end of said magazine when moving toward said plate and thereby camming the central portion of the engaged brochure insert outwardly of the discharge end of the magazine to clear said terminal edge, means for reciprocating said thrust member and guide means for camming said thrust member when the same is reciprocated, whereby each time said thrust member is reciprocated, a brochure insert is discharged laterally of the magazine and into such a container disposed in alignment with the discharge path of the insert.

5. Apparatus for feeding, one at a time, into a series of open-topped containers, brochure inserts which are asymmetrically folded to provide long flaps and short flaps and which are arranged in a stack with the short flap of each brochure facing toward the discharge end of the stack, said apparatus having in combination a frame, a magazine mounted on said frame for holding such a stack of brochure inserts and having an open discharge end into which the discharge end of the stack correspondingly extends, said discharge end of said magazine having insert-abutting retaining means adjacent one side thereof for engaging and retaining the outermost brochure insert adjacent the lower folded edge portion thereof, a retractable and projectible thrust member mounted on said frame adjacent the discharge end of said magazine for movement across the same in engagement with the outermost brochure insert, said thrust member when being retracted, moving with camming action inwardly of the discharge end of the magazine and into engagement with the upper edge portion of the long flap of the outermost brochure insert in the stack and cooperating with said retaining means in restricting movement of the brochure inserts outwardly of the magazine and in causing the flaps of the outermost brochure to separate, and said thrust member being rapidly projectible into the outermost brochure insert and across the discharge end of said magazine to carry and impel the brochure laterally of the magazine, guide means for camming said thrust member, and means for projecting and retracting said thrust member, whereby said thrust member will positively engage and carry therewith the outermost brochure insert laterally from the magazine and impel the same toward the open top of a container disposed in alignment with the discharge path thereof.

6. Apparatus for feeding, one at a time, into a series of open-topped containers, brochure inserts of the type which are asymmetrically folded to provide short flaps and long flaps and which are arranged in a stack with the short flaps facing toward the discharge end thereof, said apparatus comprising a frame, a magazine for holding a plurality of such brochure inserts, and having a discharge end into which the discharge end of the stack of brochure inserts correspondingly extends, said discharge end of the magazine having a pair of spaced stop pins mounted on opposite sides thereof for engaging the outermost brochure insert adjacent the lower folded edge portion thereof for restricting movement thereof outwardly of the magazine, a projectible and retractable thrust member mounted on said frame for movement across the discharge end of said magazine, said thrust member when being retracted, moving with a camming action inwardly of the discharge end of the magazine and into engagement with the upper edge portion of the long flap of the outermost brochure insert for cooperating with said stop elements in restricting movement of the inserts out of the magazine and in causing the flaps thereof to separate, and said thrust member being projectible into the outermost insert and toward the fold thereof and across the discharge end of said magazine to deliver and impel the insert laterally thereof, guide means for camming said thrust member, and means for projecting and retracting said thrust member, whereby the outermost brochure insert at the discharge end of the magazine will be positively opened to admit entrance of the thrust member thereinto to be discharged thereby.

7. Apparatus for feeding brochure inserts, one at a time, into a series of open-topped containers moving along a conveyor system driven by a suitable drive mechanism, said apparatus comprising a frame, a magazine mounted on said frame for holding a plurality of such brochure inserts and having a discharge end with a pair of insert-abutting stop elements disposed on opposite sides thereof for restricting outward movement of the brochure inserts longitudinally of the magazine, a thrust member mounted on said frame for reciprocation across and in close proximity with the discharge end of the magazine, said thrust member being projectible into engagement with the outermost brochure insert and between said stop elements to positively carry the brochure insert across the discharge end of said magazine to a predetermined position and cast the same laterally thereof, electrically operated powered mechanism for forcibly projecting said thrust member and including an electric solenoid drivably connected with the thrust member and an electrical control device connected with the solenoid and mounted for periodic operation by such a drive mechanism in synchronization with such a conveyor system, means for retracting said thrust member, and a positive feeder positioned laterally of said discharge end of the magazine in spaced relation with said predetermined position for receiving and positively engaging the cast brochure insert delivered thereto by said thrust member and impelling the same into the open top of such a container carried by such a conveyor system.

8. Apparatus for feeding brochure inserts one at a time, into a series of open-topped containers moving along a conveyor system powered by suitable drive mechanism, said apparatus comprising a frame, a magazine mounted on said frame for holding a plurality of such brochure inserts and having a discharge end with insert-abutting retaining means for normally preventing discharge of the brochure inserts longitudinally of the magazine, a reciprocating thrust member mounted for movement across the discharge end of said mechanism and engaging the outermost brochure insert to carry the same across the discharge end of said magazine and impel the same laterally thereof, a positive feeder positioned laterally of said discharge end of the magazine and receiving and positively engaging the brochure insert delivered thereto by said thrust member and impelling the same into the open mouth of a container disposed in alignment therewith, means for reciprocating said thrust member, operation verifying mechanism for indicating the failure of a brochure insert to be discharged when said thrust member is reciprocated, said mechanism being associated with said thrust member to be rendered operative with each reciprocation thereof and said mechanism including a trip release having a portion thereof disposed in alignment with the path of discharge of the brochure inserts from said positive feeder and also disposed in close proximity with said feeder to be engaged by such an insert while the same is being positively engaged and fed by said feeder, and said trip release being sensitive to engagement by such a brochure insert for rendering said verifying mechanism inoperative, whereby the failure of an insert to be discharged by reciprocation of said thrust member will be indicated to the attendant of the apparatus.

9. In apparatus for feeding one at a time into a series of open-topped containers, brochure inserts from a magazine holding a plurality of such inserts to be discharged, said apparatus comprising a frame, a magazine on the frame for holding a plurality of such inserts and having a discharge end, means ejecting such inserts one at a time from the discharge end of the magazine and delivering the inserts laterally thereof, an operation-verifying mechanism for detecting ejection of a brochure insert from the magazine when said ejecting means is operated, said verifying mechanism including a sensing element adjacent the magazine and in the ejection path of the inserts ejected from the magazine to be impacted and operated by said inserts to detect ejection thereof, and a rapidly moving friction element between the discharge end of the magazine and the sensing element and in closely spaced relation with the sensing element, said friction element having driving engagement with each brochure insert as the sensing element is impacted thereby, whereby to produce positive operation of the verifying mechanism when a brochure insert is ejected.

10. Apparatus for feeding brochure inserts one at a time into a series of open-topped containers from a magazine holding a plurality of such brochure inserts to be discharged, said apparatus comprising a frame, a magazine on said frame for holding a plurality of brochure inserts and having a discharge end with a terminal edge at one side thereof, said discharge end also having an insert-abutting stop element at one side thereof and spaced from said terminal edge, a reciprocating thrust member mounted on said frame for movement across the discharge end of the magazine and across said terminal edge for engaging the outermost brochure insert to carry the same across the discharge end of the magazine and deliver the same laterally thereof, said thrust member and said magazine having relative divergent camming movement in relation to each other when the thrust member moves toward said terminal edge and thereby camming the central portion of the engaged brochure insert outwardly of the discharge end of the magazine to clear said terminal edge, means for reciprocating said thrust member, and means producing said relative camming movement of the thrust member and magazine, whereby each time said thrust member is reciprocated, a brochure insert is discharged laterally of the magazine and toward such a container disposed in alignment with the discharge path of the insert.

11. Apparatus for feeding one at a time into a series of open-topped containers, brochure inserts from a magazine holding a plurality of such brochure inserts to be discharged, said apparatus comprising a frame, a magazine on the frame for holding a plurality of such inserts and having an open discharge end with a pair of spaced insert-abutting stop elements at the opposite sides thereof for retaining the outermost brochure insert at its opposite sides, a projectible and retractable thrust member mounted on the frame for movement across the discharge end of the magazine and engaging the outermost brochure insert to carry the same, when the thrust member is projected, across the discharge end of the magazine and deliver the insert laterally thereof, said thrust member camming outwardly of the discharge end of the magazine when being projected and thereby camming the engaged brochure insert outwardly of the discharge end of the magazine, means for reciprocating said thrust member, and guide means for camming said thrust member when the same is projected, whereby each time the thrust member is reciprocated, a brochure insert is moved with camming action outwardly of the discharge end of the magazine and laterally thereof to be moved toward such a container in the discharge path of the insert.

(References on following page)

References Cited in the file of this patent

UNITED STATES PATENTS

| | | |
|---|---|---|
| 1,058,258 | Phelps | Apr. 8, 1913 |
| 1,064,940 | Thompson | June 17, 1913 |
| 1,407,646 | Dunlany | Feb. 21, 1922 |
| 1,454,008 | Wooldridge | May 1, 1923 |
| 1,469,614 | Benton | Oct. 2, 1923 |
| 1,958,270 | Hawley | May 8, 1934 |
| 2,042,719 | Lindgren | June 2, 1936 |
| 2,200,842 | Gray | May 14, 1940 |
| 2,234,342 | Goodell et al. | Mar. 11, 1941 |
| 2,332,096 | McGinley | Oct. 19, 1943 |
| 2,332,156 | Long | Oct. 19, 1943 |
| 2,358,131 | Nobles | Sept. 12, 1944 |
| 2,603,150 | Klug | July 15, 1952 |
| 2,695,782 | Berg | Nov. 30, 1954 |

UNITED STATES PATENT OFFICE
CERTIFICATE OF CORRECTION

Patent No. 2,891,363

June 23, 1959

William R. Coyne

It is hereby certified that error appears in the printed specification of the above numbered patent requiring correction and that the said Letters Patent should read as corrected below.

Column 11, line 8, claim 1, after "magazine" insert -- to a predetermined position --.

Signed and sealed this 8th day of December 1959.

(SEAL)
Attest:

KARL H. AXLINE
Attesting Officer

ROBERT C. WATSON
Commissioner of Patents